Oct. 13, 1936.　　　R. L. SMITH　　　2,057,067
WEED PULLER
Filed Aug. 30, 1935
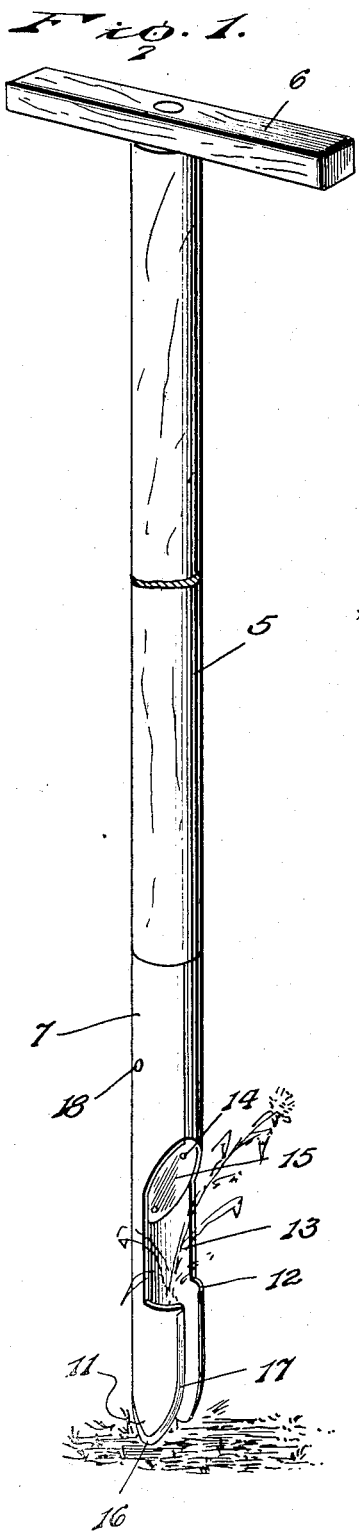
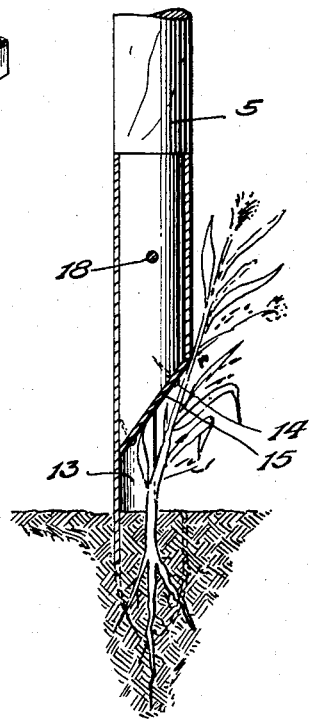
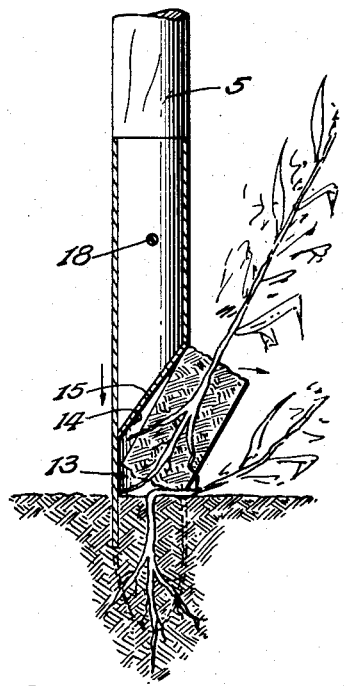
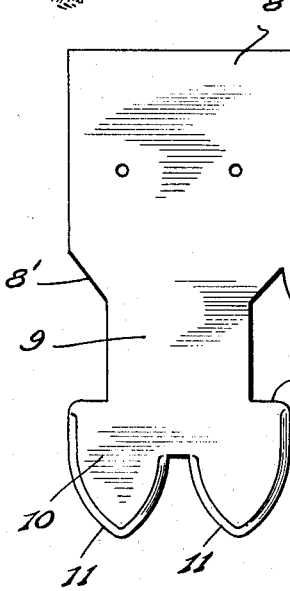
Inventor
R. L. Smith.
By Lacey & Lacey,
Attorneys Patented Oct. 13, 1936

2,057,067

UNITED STATES PATENT OFFICE 2,057,067

WEED PULLER

Robert L. Smith, Lynchburg, Va., assignor of forty-nine per cent to Edgar M. Shaner, Lynchburg, Va.

Application August 30, 1935, Serial No. 38,637

3 Claims. (Cl. 55—18)

This invention relates to weed pullers or extractors, and has for its object to provide a thoroughly efficient device of this character of inexpensive and compact construction by means of which garlic, weeds and other noxious growths may be conveniently extracted from the ground with the roots thereof intact so as to prevent further growth of the plants.

A further object of the invention is to provide a weed extractor, the construction of which is such that the initial operation of the tool will extract a weed from the ground, and a further use thereof will cause the first weed to be automatically ejected at the side of said tool.

A further object is to provide a weed extractor including a tubular body portion having terminal coacting cutting blades and provided with an inclined deflector spaced from the upper ends of the blades and against which the weeds or plants are forced and successively ejected from the tool during the operation thereof.

A further object of the invention is generally to improve this class of devices so as to increase their utility, durability and efficiency.

In the accompanying drawing, forming a part of this specification, and in which similar numerals of reference indicate corresponding parts in all the figures of the drawing, Figure 1 is a perspective view of an automatic weed extractor embodying the present invention.

Figure 2 is a vertical sectional view showing the position of the parts when extracting the first weed.

Figure 3 is a similar view showing how the first weed is automatically ejected at one side of the tool by contact with another weed in the further operation of said tool.

Figure 4 is a plan view of the blank from which the active end of the extractor is constructed.

The improved weed extractor forming the subject-matter of the present invention includes a shank or staff 5 of any desired length and formed of wood, metal, or other suitable material, said shank having its upper end provided with a transverse bar constituting a handle 6 to facilitate the use of the tool. Secured to the lower end of the shank or staff 5 is a tubular member 7 preferably constructed from a blank of the construction shown in Figure 4 of the drawing. The blank comprises a substantially rectangular body portion 8 having downwardly inclined edges 8' defining a reduced neck 9 terminating in spaced lobes 10 constituting cutting blades 11. Transverse shoulders 12 are formed at the junction of the lobes 10 with the neck 9 so that when the blank is rolled into tubular form, a lateral opening 13 will be formed in the tool immediately above the shoulders and at one side of the tool. The lower end of the staff 5 is provided with an inclined face and fitting over this face and secured thereto by nails or similar fastening devices 14 is a plate 15 which acts as a deflector and serves to successively eject the extracted plants laterally at one side of the tool. The plate 15 may be stamped or otherwise formed integral with the blank, as shown in Figure 4 of the drawing, or may be made separate therefrom and secured to the bottom of the shank, as desired. The lower ends of the cutting blades are provided with pointed terminals 16 and the front and rear edges of said blades are preferably sharpened at 17 so as to assist in cutting dirt when the tool is forced into the ground and rotated, or partially rotated.

In operation, the implement is positioned over a growth of garlic or other plant to be extracted, and the blades 11 forced into the ground at opposite sides thereof by exerting a slight downward pressure on the handle 6, thereby causing the blades to encompass the roots of the plant and force the adjacent soil, together with the plant, between the blades, as best shown in Figure 2 of the drawing. The tool then is given a half turn while in the ground and withdrawn from the ground carrying with it the weed with its root intact and with the adjacent soil adhering thereto. During the withdrawal of the tool from the ground, a part of the foliage of the plant will be engaged by the shoulders 12 and thus assist in extracting the plant. When the tool is again used for extracting a plant, the cutting blades are forced downwardly into the ground around the weed to be extracted in the manner before described, and this downward pressure exerted on the staff 5 will cause the weed being extracted and the dirt surrounding the same to press upwardly on the weed first extracted and force said first weed against the plate 15 so as to automatically eject the first weed laterally at one side of the tool, as best shown in Figure 3 of the drawing, and this operation will be repeated during subsequent use of the tool. It will thus be seen that the weeds are successively ejected at one side of the tool during the operation thereof and that this automatic ejection of the weeds is effected by the deflector or ejecting member 15 as the weeds are successively forced in contact therewith by the dirt surrounding the weed being ejected. In other words, the invention provides a tool, the construction of which is such that the initial operation of the tool will extract a weed from the ground and a further use thereof will cause the first weed to be ejected from the tool so that the tool is, in effect, automatic in operation. The lower end of the tubular member 7 is preferably secured to the adjacent end of the shank 5 by fastening devices 18 but if desired instead of making the shank 5 of wood and the tubular member 7 of metal, said parts may be of integral formation and constructed of metal or other suitable material. It will also be understood that the tools may be made in different sizes and shapes and the space between the blades may vary according to the size or nature of the plant or weed to be extracted.

Having thus described the invention, what is claimed as new is:

1. A weed extractor formed from a single metallic blank comprising a substantially rectangular body portion having downwardly inclined edges defining a reduced neck terminating in spaced lobes constituting cutting blades, there being a substantially elliptical shaped plate extending laterally from one of the inclined edges of the rectangular portion of the blank, said blank being adapted to be rolled into tubular form with the elliptical shaped plate extending downwardly within the tube in spaced relation to the cutting blades to form a plant ejector.

2. A weed extractor comprising a shank having a diagonally extending lower end face, a tubular member having its upper portion secured about the lower end portion of said shank and projecting downwardly from the shank and formed with spaced cutting blades at its lower end, a portion of the tubular member directly below the shank being cut away to form a side opening having a diagonally extending upper end and a straight cut horizontally extending lower end, and a plate secured flat against and covering the diagonally extending end face of the shank with its marginal portions bordered by portions of the tubular member at the upper end of the side opening, said plate constituting a shield for the lower end face of the shank and serving as a deflector for ejecting plants laterally through the side opening of the tubular member.

3. A weed extractor formed from a single metallic blank comprising a substantially rectangular body portion having opposed recesses leading from its side edges intermediate its length and defining a reduced neck and wide upper and lower portions, the lower portion having a recess leading from its lower edge intermediate its width and defining spaced lobes, the marginal edges of which are sharpened and constitute cutting blades, and a plate extending from a side of the blank in position to fit beneath the wide upper portion of the body when the blank is bent into tubular shape and form a bottom for a handle receiving socket and being disposed at an incline and constituting a plant ejector.

ROBERT L. SMITH.